United States Patent [19]

Miyagawa et al.

[11] Patent Number: 5,553,250
[45] Date of Patent: Sep. 3, 1996

[54] BUS TERMINATING CIRCUIT

[75] Inventors: Takao Miyagawa; Akinori Kashio; Ken Hashimoto; Makoto Yasuda; Hidenobu Sakai; William C. Kutsche, all of Nagaokakyo, Japan

[73] Assignee: Murata Manufacturing Co., Ltd., Japan

[21] Appl. No.: 281,259

[22] Filed: Jul. 27, 1994

Related U.S. Application Data

[63] Continuation of Ser. No. 109,402, Aug. 19, 1993, abandoned, which is a continuation of Ser. No. 811,708, Dec. 20, 1991, abandoned.

[30] Foreign Application Priority Data

| Dec. 20, 1990 | [JP] | Japan | 2-413559 |
| Mar. 1, 1991 | [JP] | Japan | 3-061174 |
| Jul. 19, 1991 | [JP] | Japan | 3-204948 |
| Sep. 5, 1991 | [JP] | Japan | 3-254499 |
| Oct. 11, 1991 | [JP] | Japan | 3-292154 |
| Dec. 10, 1991 | [JP] | Japan | 3-350890 |

[51] Int. Cl.$^6$ ............................................. G06F 13/40
[52] U.S. Cl. ............................ 395/309; 326/30; 326/86
[58] Field of Search ................................ 395/325, 725, 395/275, 200, 280, 309, 310, 306; 326/30, 86, 90

[56] References Cited

U.S. PATENT DOCUMENTS

| 4,220,876 | 9/1980 | Ray | 327/594 |
| 4,674,085 | 6/1987 | Aranguren | 370/85.2 |
| 4,748,426 | 5/1988 | Stewart | 333/22 R |
| 4,920,339 | 4/1990 | Friend | 340/825.52 |
| 5,029,284 | 7/1991 | Feldbaumer | 326/30 |
| 5,101,153 | 3/1992 | Morong | 324/537 |
| 5,239,658 | 8/1993 | Yamamuro et al. | 395/800 |
| 5,272,396 | 12/1993 | Mammano et al. | 326/21 |
| 5,309,569 | 5/1994 | Warchol | 395/306 |
| 5,313,595 | 5/1994 | Lewis et al. | 395/306 |
| 5,367,647 | 11/1994 | Coulson et al. | 395/285 |

OTHER PUBLICATIONS

*Microelectronic Circuits*; Sedra, Adel and Smith, Kenneth; Holt, Rinehart and Winston; 1982; p. 509.

Primary Examiner—Jack B. Harvey
Assistant Examiner—Glenn A. Auve
Attorney, Agent, or Firm—Ostrolenk, Faber, Gerb & Soffen, LLP

[57] ABSTRACT

A bus terminating circuit is provided on each of a plurality of SCSI devices connected to each other through an SCSI bus line. A first terminating resistor is inserted between each of the signal lines and a power source line of the bus line and a second terminating resistor is inserted between each of the signal lines and ground. A first transistor is connected between the first terminating resistor and the power source line and a second transistor is connected between the second terminating resistor and ground. The first and second transistors are turned-on or off in response to an ON signal or an OFF signal inputted from an external terminal so that the first and second resistors can be connected or disconnected to or from the bus line.

20 Claims, 15 Drawing Sheets

F I G.17
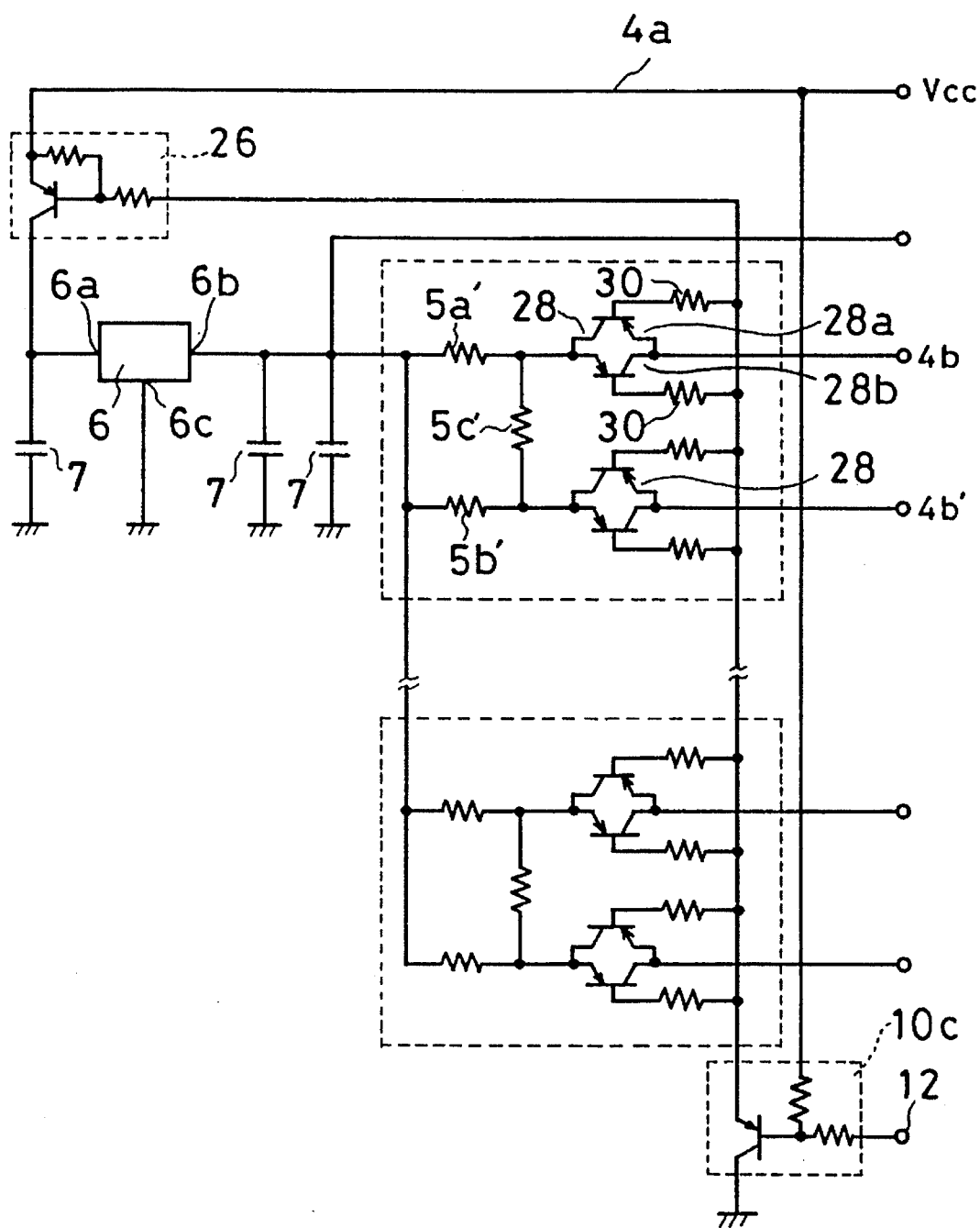

BUS TERMINATING CIRCUIT

This is a continuation of application Ser. No. 08/109,402, filed on Aug. 19, 1993, now abandoned which is a continuation of application Ser. No. 07/811,708, filed Dec. 20, 1991, now abandoned.

BACKGROUND OF THE INVENTION

1. Field of the Invention

The present invention relates to a bus terminating circuit. More specifically, the present invention relates to a circuit for terminating a bus line between computer equipment which utilizes an SCSI interface (small computer system interface), for example, and a method for connecting or disconnecting terminating resistors to or from the bus line.

2. Description of the Prior Art

Conventionally, as standard interfaces for small sized computers, "GP-IB" which is mainly used in the field of automatic measurement, "RS-232C" which is mainly used in the field of communication, etc., were known. The interface is used by being incorporated in a host computer or by being added to a board as an option. The interface has electric or electronic specifications and an execution procedure both determined dependent on a required function, and the interface and the host computer are connected to each other through a bus line at portions where electrical levels become identical to each other.

An interface according to an SCSI standard also accesses an SCSI bus line via a host adapter. In an SCSI system, an apparatus such as the host computer sending a command is called an initiator and an apparatus such as a hard disk, printer or the like executing the command is called a target. However, in the SCSI system, according to circumstances, it is allowed that the initiator becomes a target and the target becomes an initiator inversely. The initiator and the target are connected to each other by the SCSI bus line. All the equipment existing on the SCSI bus line are called SCSI devices irrespective of whether they are initiators or targets. On the SCSI bus line, typically, eight SCSI devices at most can be connected.

Signals for the SCSI device are as shown in FIG. 1, for example. In FIG. 1, a reference numeral 1 denotes an initiator and a reference numeral 2 denotes a target. The SCSI bus line includes eighteen signal lines in total, composed of nine upper data signal lines (including one line for an odd parity bit) and nine lower control signal lines. On each of the signal lines, a binary signal "0" or "1" is transmitted.

One example of a connection between the initiator 1 and the target 2 is shown in FIG. 2. FIG. 2 shows a connection called a single ended type. As shown in FIG. 2, the initiator 1 and the target 2 are connected to each other through an SCSI bus line 3. A reference numeral 4a denotes a power source line to which a power source voltage Vcc (normally, 5 volts) is applied. A reference numeral 4b denotes a single signal line as shown in FIG. 1 and, although not shown, the SCSI bus line 3 actually includes eighteen(18) signal lines as described above. A reference numeral 4c denotes a ground line and, in fact, a plurality of ground lines are provided. The power source line 4a, signal lines 4b and ground lines 4c are put together and called the bus line 3.

A reference numeral 5 denotes a terminator which includes two terminating resisters 5a and 5b connected in series between the power source line 4a and the ground. The terminator 5 is provided for the purpose of impedance matching so that the binary signal can be transmitted as an accurate square wave on the SCSI bus line 3 between the initiator 1 and the target 2. Therefore, a series connection point A of the terminating resistor 5a and 5b is connected to the signal line 4b. Such a terminator 5 is provided in each SCSI device. In the SCSI system a number of terminators 5 corresponding to the number of signal lines are provided for each SCSI device. In addition, in a case of the single ended type shown as in FIG. 2, resistance values of the terminating resistor 5a and 5b are defined as 220 ohms and 330 ohms, respectively.

Next, one example of the SCSI system is shown in FIG. 3. In FIG. 3, reference numerals 2a, 2b, 2c and 2d respectively show the target 2 such as a printer, floppy disk, scanner, hard disk, etc. In a case where a plurality of SCSI devices are connected to each other as shown in FIG. 3, depending on the specification of the SCSI system, the terminating resistors of the devices (in the case of FIG. 3, the targets 2a, 2b and 2c) connected between the devices at both ends (in the case of FIG. 3, the initiator 1 and the target 2d) on the SCSI bus line 3 must be disconnected from the bus line 3. Conventionally, for connecting/disconnecting the terminating resistors, two methods were known, (i) a method where mechanical switches such DIP switches are provided at positions shown by the reference symbol A in FIG. 2 and are turned on or off, and (ii) a method where a connector or resistor module which incorporates the terminator 5 (in FIG. 2, the two terminating resistors 5a and 5b between positions denoted by reference symbols B and C) is attached or detached.

However, in the former method, a number of switch contacts corresponding to the number of the signal lines (eighteen in the case of FIG. 2) are needed. In addition, even when the switch (not shown) is turned-off, the terminating resistors 5a and 5b are always supplied with the power source voltage from the power source line 4a (FIG. 2), and therefore, an electric power of approximately 0.8 W is consumed in each device. Therefore, there was a disadvantage that electric power is wastefully consumed in the targets 2a, 2b and 2c shown in FIG. 3, just as power is consumed when the terminating resistors thereof are connected to the bus line.

In the latter method, unlike the former method, no electric power is consumed at the terminating resistors if the same are disconnected from the bus line; however, it requires maintenance to keep the connector incorporating the terminating resistors or the terminating resistor module. Therefore, conventionally, there was a problem that the above described connector or module may be missed. In addition, since the connector or module is manually attached to or detached from the device, in a recent situation where a plurality of devices must be connected in a complex arrangement, the work required for attachment or detachment of the connector or module is troublesome, and therefore, this troublesomeness becomes a large obstacle to changing the system.

Furthermore, in a case of the single ended type as shown in FIG. 2, the characteristic impedance of the signal line is generally less than 110 ohms, while the impedance of the terminator 5 viewed from the signal line 4b becomes 132 ohms. Therefore, a mismatch easily occurs, and therefore, to that extent, the bus line (cable) cannot be made longer and the transmission rate of a signal cannot be made greater.

Therefore, in order to solve such problems, the SCSI-2 system according to a revised version was proposed. One example of a bus line for the SCSI-2 system is shown in FIG.

4. In FIG. 4, a reference numeral 5c denotes a terminating resistor which has a resistance value of 110 ohms. An input of a 3-terminal regulator 6 is connected to the power source line 4a, and the regulator 6 adjusts the power source voltage 5 to a level of approximately 2.85 volts which is supplied to the terminating resistor 5c from an output thereof. Between the power source line 4a and the ground line 4c, and between the series connection point of the regulator 6 and the terminating resistor 5c and the ground line 4c, capacitors 7 are connected. These capacitors 7 are provided for purpose of elimination of a noise and ripple on the power source line 4a and the output line of the regulator 6.

In the circuit for terminating the bus line 3 shown in FIG. 4, the above-described problems still remain with respect to the connection/disconnection of the terminating resistor.

Furthermore, there was a similar problem in the SCSI bus line of a differential type as shown in FIG. 5. The SCSI bus line 3 shown in FIG. 5 includes eighteen(18) first signal lines 4b and eighteen(18) second signal lines 4b'. Each second signal line 4b' transmits a signal which is the of a signal transmitted on a corresponding one of the first signal lines 4b. There is further single power source line 4a and one or more ground lines 4c. More specifically, by a driver 4c' and a receiver 4d which are complementarily combined with the first signal line 4b and the second signal line 4b', a signal level on the first signal line 4b and a signal level on the second signal line 4b' are inverted with respect to each other. Further, a terminator 5 includes three terminating resistors 5a, 5c and 5b connected in series between the power source line 4a and ground, and a series connection point A of the terminating resistors 5c and 5b is connected to the first signal line 4b and a series connection point A' of the terminating resistors 5a and 5c is connected to the second signal line 4b'. In the case of the differential type as shown in FIG. 5, the terminating resistors 5a, 5b and 5c are defined as 330 ohms, 330 ohms and 150 ohms, respectively. Then, by comparing a voltage level of the first signal line 4b and a voltage level of the second signal line 4b' with each other, "1" or "0" can be determined.

In the terminating circuit for the SCSI bus line 3 of the differential type as shown in FIG. 5, if the aforementioned connection/disconnection method (i) is utilized, mechanical switches are provided at positions shown by reference symbols A and A'. Therefore, in the example shown in FIG. 5, fifty-four(54) switches are required.

SUMMARY OF THE INVENTION

Therefore, a principal object of the present invention is to provide a novel bus terminating circuit and a method for connecting/disconnecting terminating resistors to or from a bus line.

Another object of the present invention is to provide a terminating circuit in which terminating resistors can be simply or easily connected/disconnected to or from a bus line.

Another object of the present invention is to provide a bus terminating circuit and a method for connecting/disconnecting terminating resistors to or from a bus line, which requires wasteful consumption of electric power when the terminating resistors are disconnected from the bus line, and no troublesome maintenance.

A bus terminating circuit in accordance with the present invention terminates a bus line which includes a power source line, signal line and ground line, and comprises: a terminator to be connected or disconnected to or from a bus line; an active element provided in association with the terminator for connecting or disconnecting the terminator to or from the bus line in accordance with an input signal; an external terminal for receiving a control signal from an external source; and input means for applying the input signal to the active element in accordance with the control signal being applied to the external terminal.

For example, an ON signal may be applied to the external terminal from a switch provided on each device, or an ON signal may be electrically applied to the external terminal by software, and the input means applies the ON signal to the active element in response to such control signal. If the ON signal is applied, the active element is turned-on, and therefore, the terminator is connected to the bus line. If an OFF signal is applied to the external terminal, the active element is turned-off so that the terminator is disconnected from the bus line.

In accordance with the present invention, only the control signal is applied to the external terminal, whereby it is possible to perform connection/disconnection of the terminator to or from the bus line. Since the active element is turned-off in response to the OFF signal, the terminator can be electrically disconnected from the bus line. Therefore, in disabling the terminator, no wasteful electric power is consumed. Furthermore, even if the bus terminating circuit in accordance with the present invention is fixedly incorporated in the device, it is only necessary to input the control signal to the external terminal, to implement connection/disconnection of the terminator to or from the bus line, so no troublesome maintenance is required for keeping the connector incorporating terminating resistors or the terminating resistor module as must be done in the prior art.

In one aspect in accordance with the present invention, a bus terminating circuit comprises: a first series connection of a first terminating resistor and a first active element connected between a power source line and a signal line, said first active element being turned-on or off by a first input signal; a second series connection of a second terminating resistor and a second active element connected between the signal line and a ground line, said second active element being turned-on or off by a second input signal; and an external terminal for receiving a control signal from an external and for applying the first input signal and the second input signal to the first active element and the second active element, respectively.

In this aspect, when an ON signal is applied to the external terminal, the first active element and the second active element are both turned-on in response to such a control signal, and therefore, the first terminating resistor is connected between the power source line and the signal line and the second terminating resistor is connected between the signal line and the ground line.

In another aspect in accordance with the present invention, a bus terminating circuit is applied to a bus line which includes a first signal line and second signal line for transmitting signals having polarities opposite to each other. Therefore, the first series connection is connected between the power source line and the second signal line and the second series connection is connected between the ground line and the first signal line, and the bus terminating circuit further comprises a third series connection of a third terminating resistor and a third active element connected between the first terminating resistor and the second terminating resistor, said third active element being turned-on in response to at least one of the signals on the first signal line and the second signal line.

In another aspect in accordance with the present invention, a bus terminating circuit comprises: a regulator having an input end connected to a power source line for adjusting a voltage inputted to the input end into a constant voltage to be outputted from an output end thereof; a series connection of a terminating resistor and an active element connected between the output end of the regulator and the signal line, said active element being turned-on or off by an input signal; and an external terminal for receiving a control signal from an external and for applying the input signal to the active element.

In a still further aspect in accordance with the present invention, a bus terminating circuit is applied to a bus line which includes a power source line, ground line and first signal line and second signal line for transmitting signals having polarities opposite to each other. In such a case, the bus terminating circuit comprises: a regulator having an input terminal connected to the power source line and for regulating a voltage inputted to the input end into a constant voltage to be outputted from an output end thereof; a first terminating resistor having one end connected to the output end of the regulator; a second terminating resistor having one end connected to the output end of the regulator; and a third terminating resistor having both ends connected to another end of the first terminating resistor and another end of second terminating resistor, respectively.

Preferably, the bus terminating circuit further comprises: a first active element connected between said another end of the first terminating resistor and the first signal line for being turned-on or off in accordance with a first input signal; a second active element connected between said another end of the second terminating resistor and the second signal line for being turned-on or off in accordance with a second input signal; and an external terminal for receiving a control signal from an external for applying the first input signal and the second input signal to the first active element and the second active element, respectively.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 17 is a circuit diagram showing a modified example of FIG. 16 embodiment.

DETAILED DESCRIPTION OF THE PREFERRED EMBODIMENTS

Figure 1:
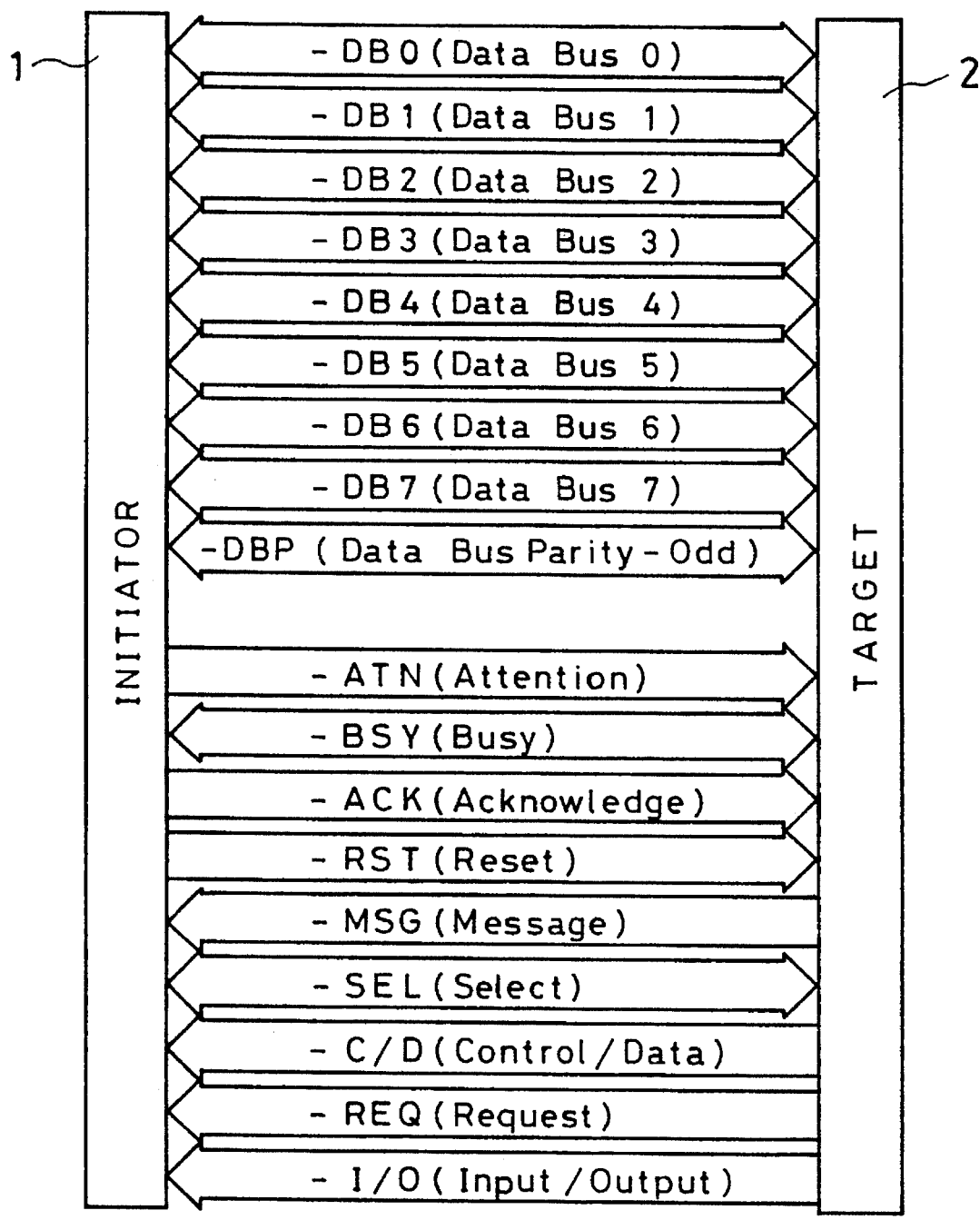
FIG. 1 is an illustrative view showing signals on an SCSI bus line.
Figure 2:
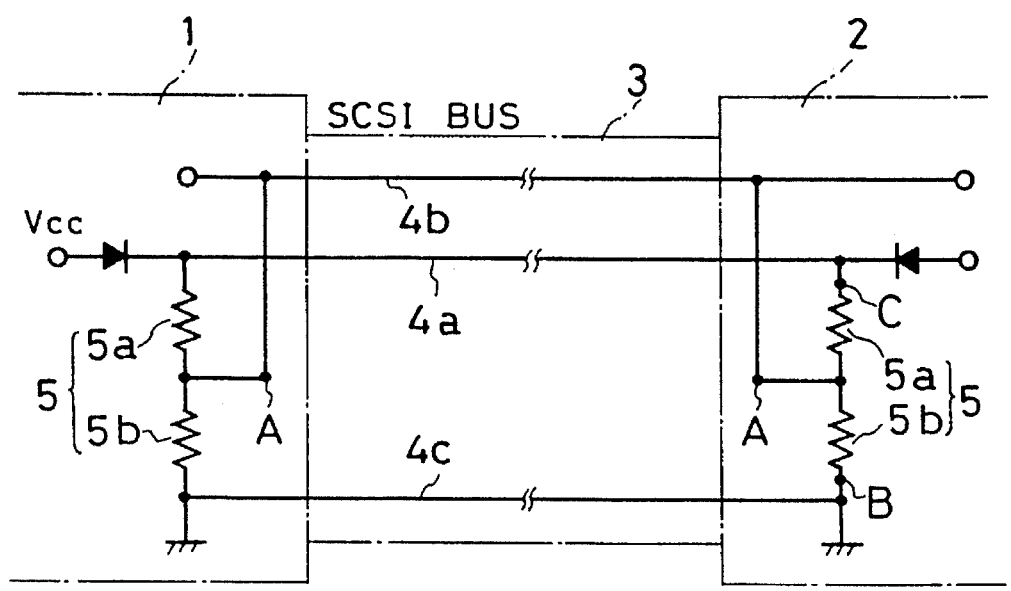
FIG. 2 is a circuit diagram showing one example of a conventional bus terminating circuit of a single ended type.
Figure 3:
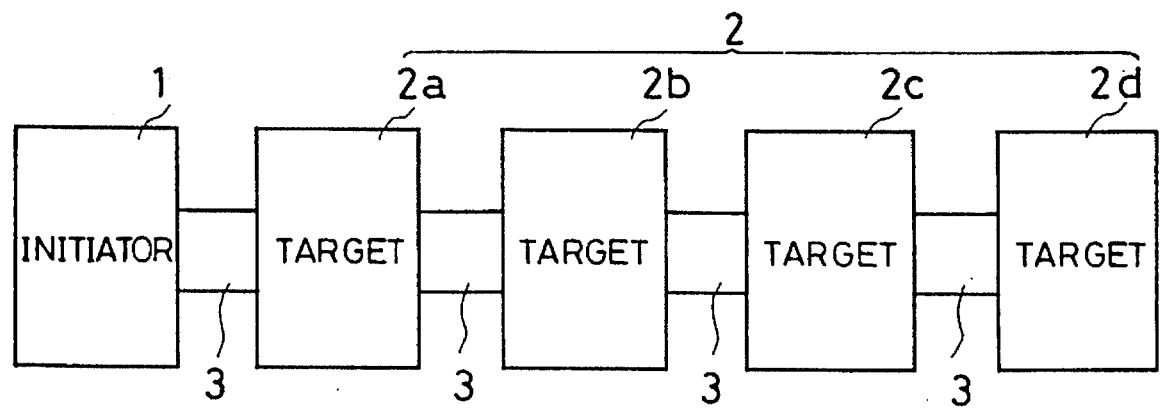
FIG. 3 is an illustrative view showing one example of connection of a conventional SCSI system.
Figure 6:
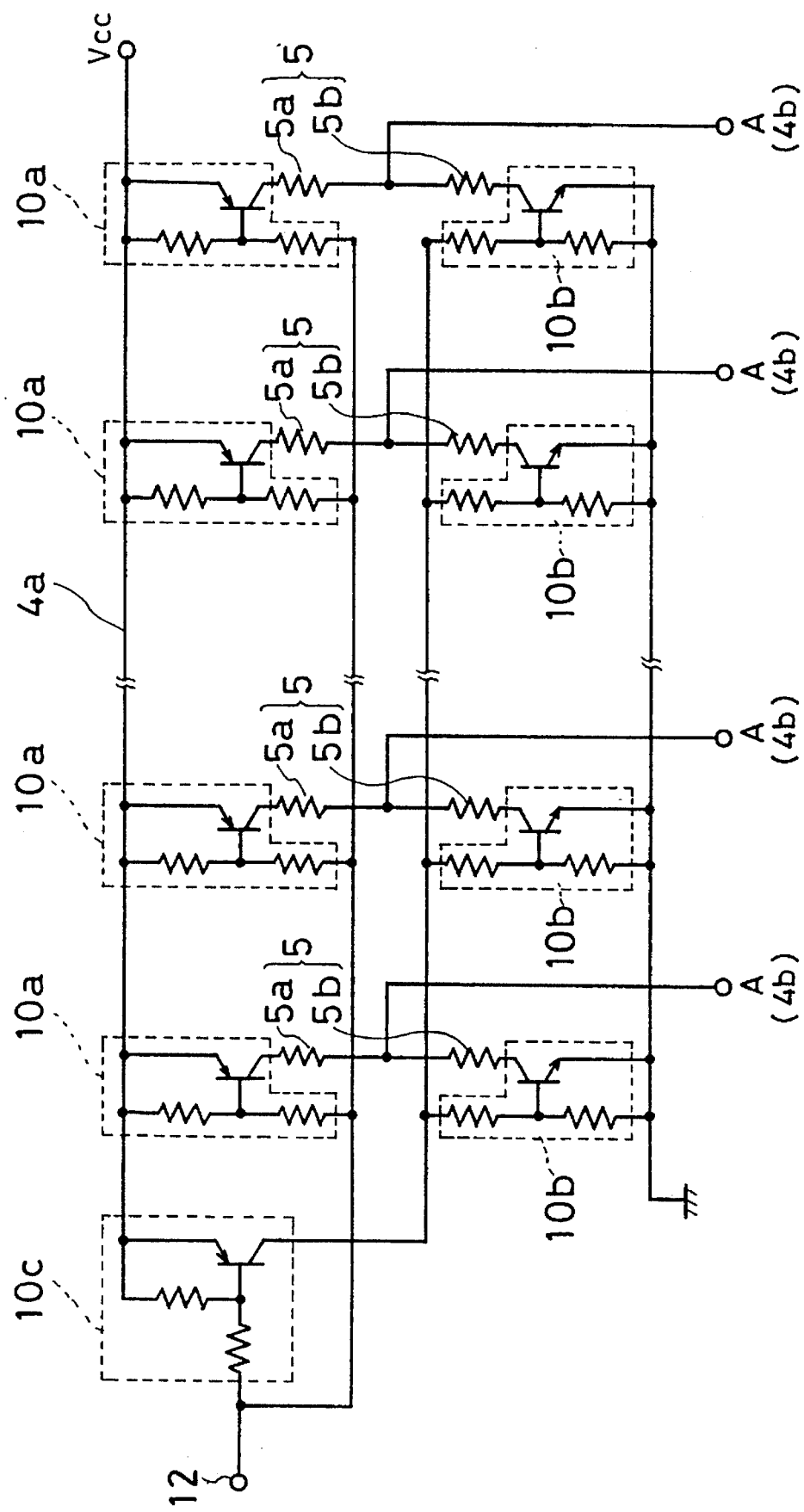
FIG. 6 is a circuit diagram showing an embodiment in which the present invention is applied to FIG. 2 bus terminating circuit.

FIG. 6 shows one embodiment in accordance with the present invention which is applied to the SCSI bus line 3 of a single ended type as shown in FIG. 2. In this embodiment shown, active elements are respectively provided at both ends of the terminator 5, that is, positions denoted by reference symbols B and C in FIG. 2.

In FIG. 6, active elements are enclosed with dotted lines and each active element comprises resistors and a selected type of transistor, as denoted by reference numerals 10a and 10b. In this embodiment shown, each of the transistors 10a is constructed as a PNP transistor and each of the transistors 10b is constructed as an NPN transistor. In either case, each of the transistors 10a and 10b functions as a switch which is turned-on or off by an external signal applied from an external terminal 12. The transistor 10a is inserted between a terminating resistor 5a constituting the terminator 5 and the power source line 4a, and the transistor 10b is inserted between a terminating resistor 5b constituting the terminator 5 and the ground. A series connection point of the terminating resistors 5a and 5b is connected to a position denoted by a reference symbol A in FIG. 2, that is, to the signal line 4b.

A control signal (ON signal or OFF signal) inputted to the external terminal 12 is applied to the base of the transistor 10a, and to the base of a transistor denoted by a reference numeral 10c. The transistor 10c is constructed as a PNP transistor similar to the transistor 10a, and the transistor 10c inverts the signal from the external terminal 12 to apply to a base of the transistor 10b. In addition, it will be easily understood that in FIG. 6, for simplifying the drawing, although only four(4) sets of terminators 5 are illustrated; however, in fact, eighteen(18) sets of terminators 5 corresponding to the number of the signal lines 4b are provided. In the following embodiments, as in FIG. 6, illustration of some components will be omitted on occasion.

In operation, when an ON signal of a low level is inputted to the external terminal 12, the transistor 10a is turned-on and, since a signal of a high level is outputted from the transistor 10c, the transistor 10b is also turned-on. Therefore, it is possible to obtain a state where the terminator 5 is connected to the bus line 3. That is, the terminating resistor 5a is connected between the signal line 4b and the power source line 4a and the terminating resistor 5b is connected between the signal line 4b and ground.

If an OFF signal of a high level is inputted from the external terminal 12, the transistor 10a is turned-off, and therefore, the terminating resistor 5a is disconnected from the power source line 4a. At that time, a signal of a low level is outputted from the transistor 10c, and therefore, the transistor 10b is also turned-off so that the terminating resistor 5b is disconnected from ground. Thus, it is possible to obtain a state where the terminator 5 is disconnected from the bus line 3.

In the FIG. 6 embodiment, the ON signal of the low level or the OFF signal of the high level is applied to the external terminal 12; however, the polarities of the ON signals and OFF signals may be inverted. In this case, an embodiment shown in FIG. 7 can be utilized. In the FIG. 7 embodiment, the transistor 10c is constructed as an NPN transistor, and an output of the transistor 10c is applied to the base of the transistor 10a, and the control signal from the external terminal 12 is directly applied to the base of the transistor 10b.

Figure 7:
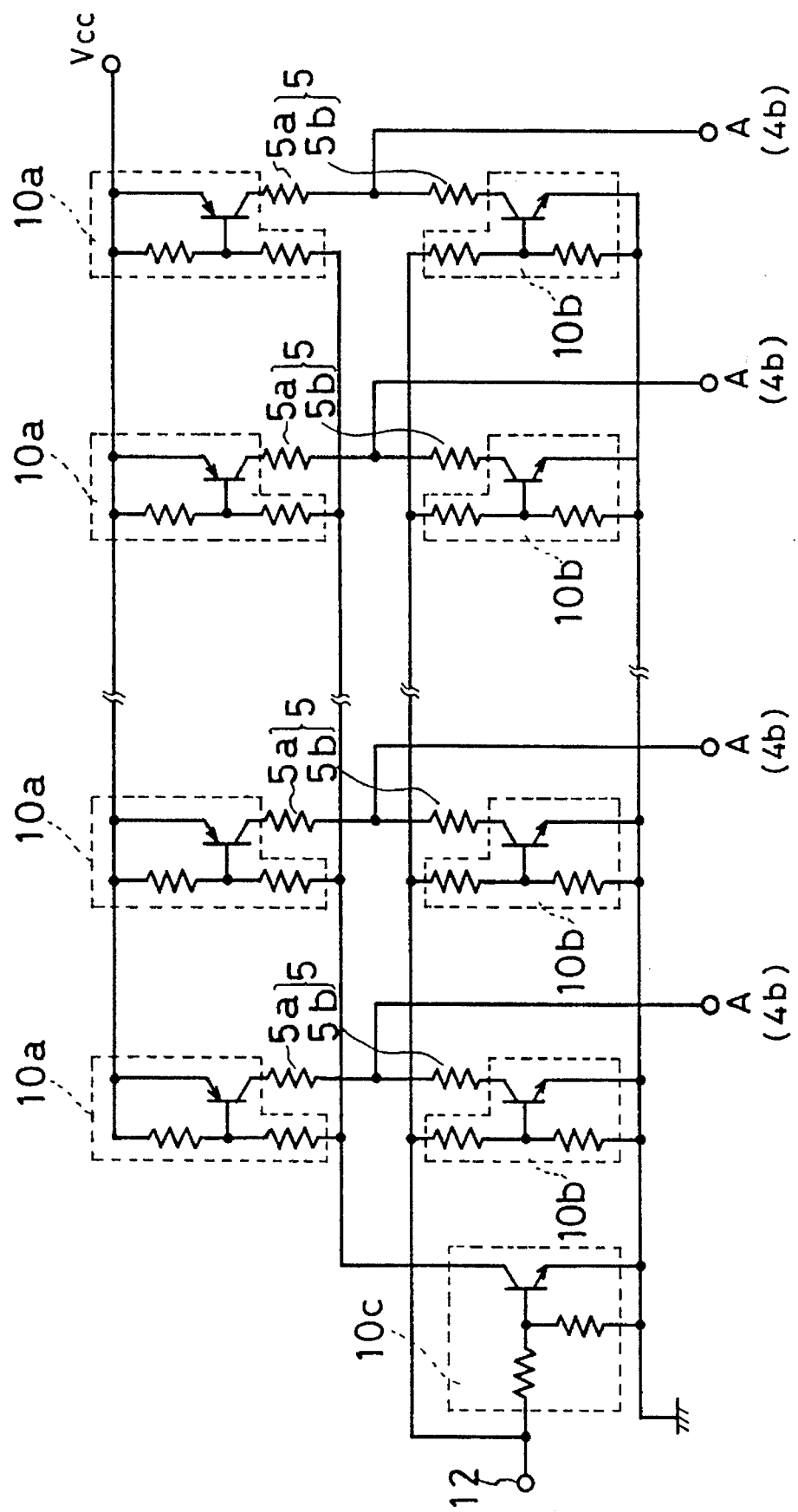
FIG. 7 is a circuit diagram showing a modified example of FIG. 6 embodiment.

In the FIG. 7 embodiment, when the ON signal of a high level is inputted from the external terminal 12, since a signal of a low level is outputted from the transistor 10c, the transistor 10a is turned-on, and the transistor 10b is also turned-on. Therefore, it is possible to obtain a state where the terminator 5 is connected to the bus line 3. If the OFF signal of a low level is inputted to the external terminal 12, the transistors 10a and 10b are both turned-off, and therefore, it becomes a state where the terminator 5 is disconnected from the bus line 3.

It will be easily understood by those skilled in the art that in the FIG. 6 or 7 embodiment, each of the transistors 10a may be an NPN transistor and each of the transistors 10b may be a PNP transistor, and that the transistor 10a and the terminating resistor 5a may be inverted in their positions and the transistor 10b and the terminating resistor 5b may be inverted in their positions. That is, between the power source line 4a and the signal line 4b, only a series connection of the terminating resistor 5a and an active element such as the PNP transistor or NPN transistor 10a may be connected, and only a series connection of the terminating resistor 5b and an active element such as the NPN transistor or PNP transistor 10b may be connected between the signal line 4b and the ground.

Figure 8:
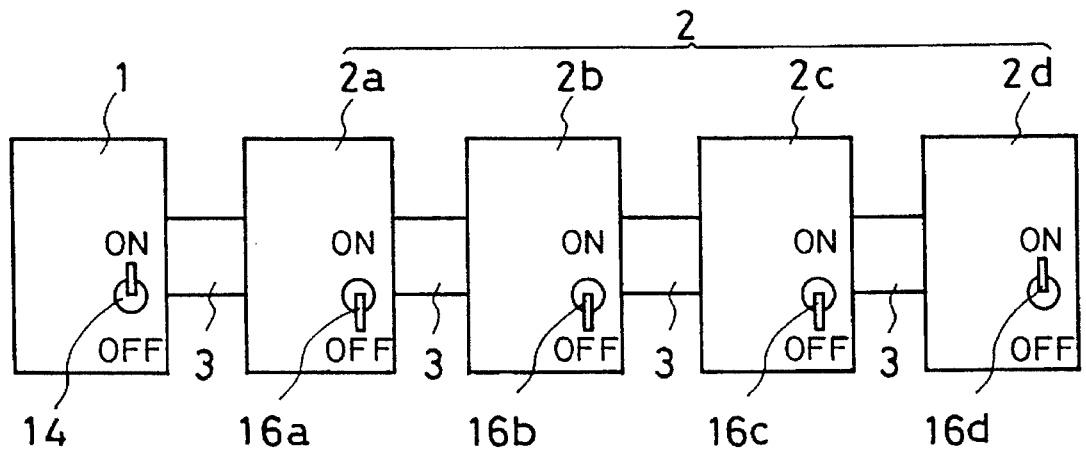
FIG. 8 is an illustrative view showing one example of an SCSI system which includes switches capable of inputting an ON signal or OFF signal from an external terminal in respective embodiments in accordance with the present invention.

In order to apply the ON signal or OFF signal to the external terminal 12 of the FIG. 6 embodiment or the FIG. 7 embodiment, as shown in FIG. 8, switches 14, and 16a, 16b, 16c and 16d may be provided on the initiator 1, and the targets 2a, 2b, 2c and 2d. If each of the switches 14 and 16a–16d is turned-on, the ON signal of a low level in the FIG. 6 embodiment or the ON signal of a high level in the FIG. 7 embodiment is applied to the external terminal 12. If each of the switches 14 and 16a–16d is turned-off, the OFF signal of a high level in the FIG. 6 embodiment or the OFF signal of a low level in the FIG. 7 embodiment is applied to the external terminal 12.

Figure 5:
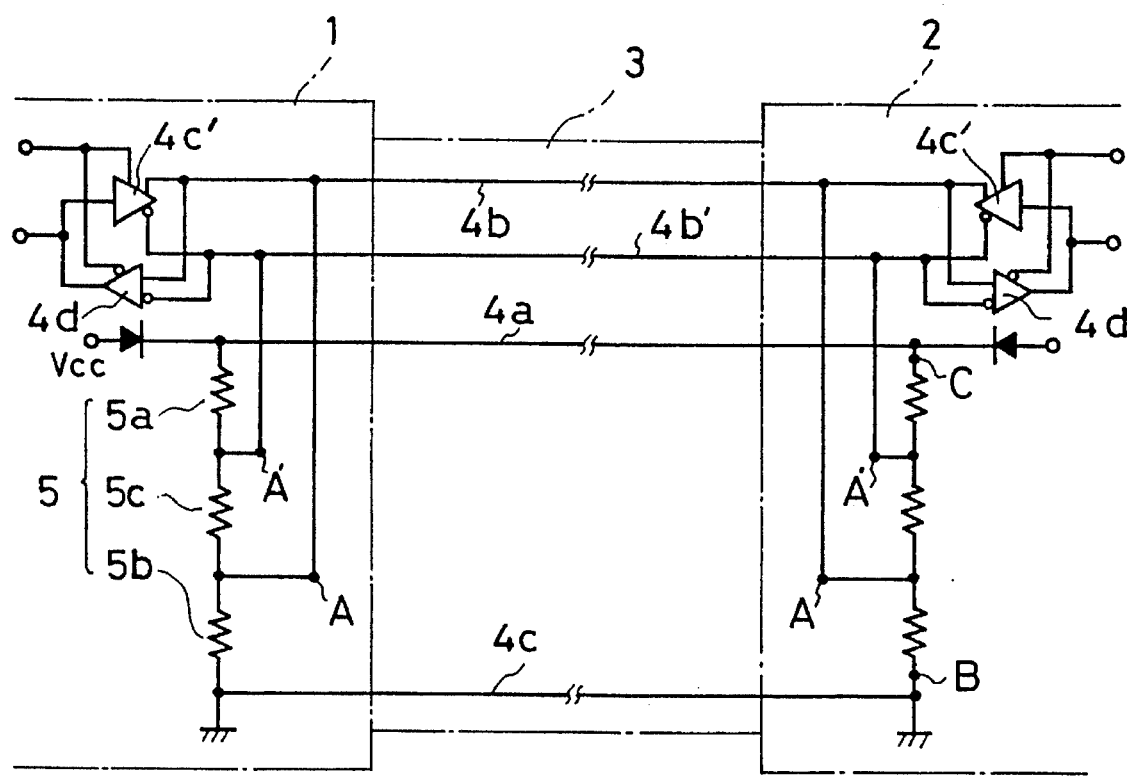
FIG. 5 is a circuit diagram showing one example of a conventional bus terminating circuit of a differential type.
Figure 9:
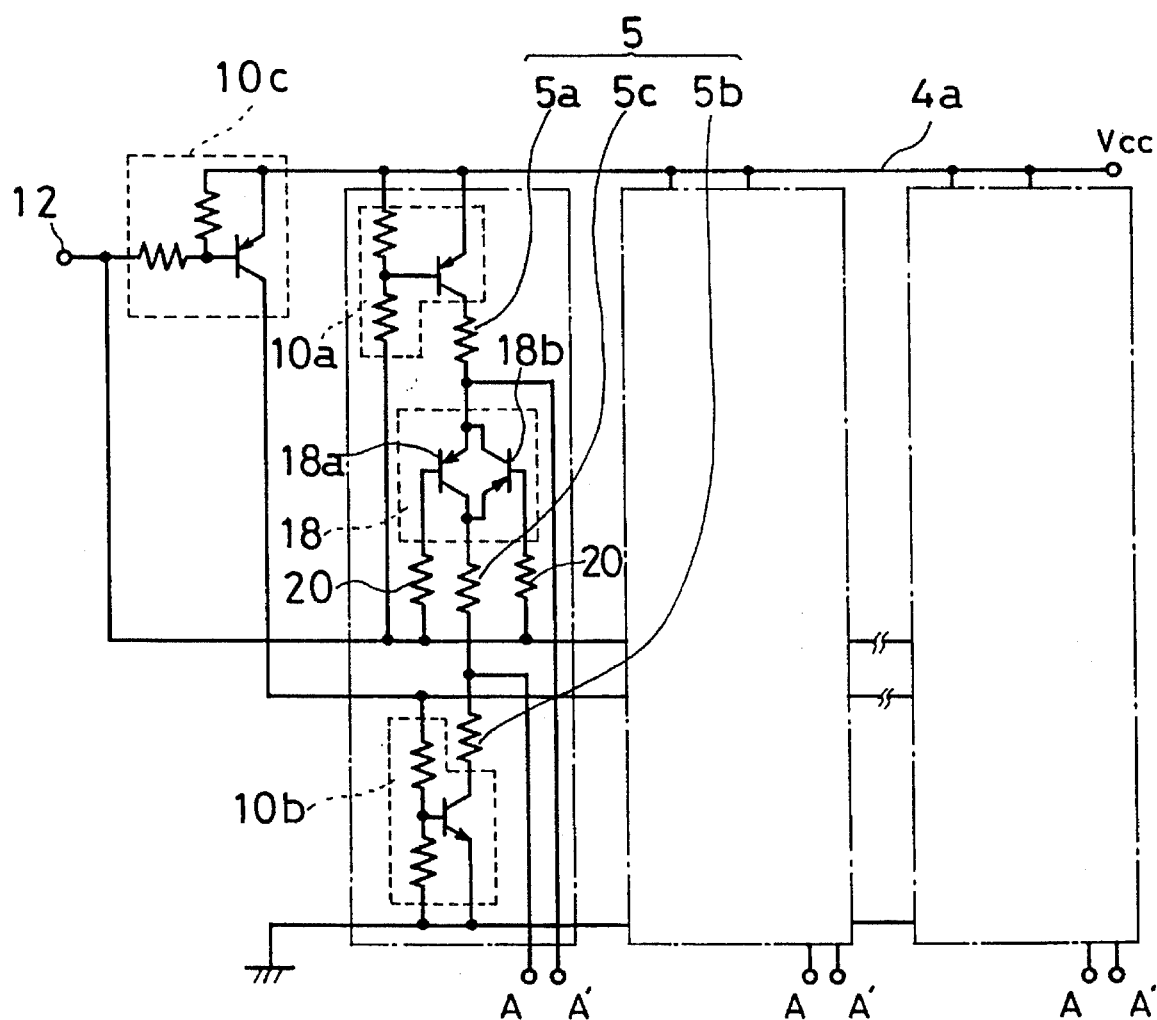
FIG. 9 is circuit diagram showing another embodiment in which the present invention is applied to FIG. 5 bus terminating circuit.
Figure 10:
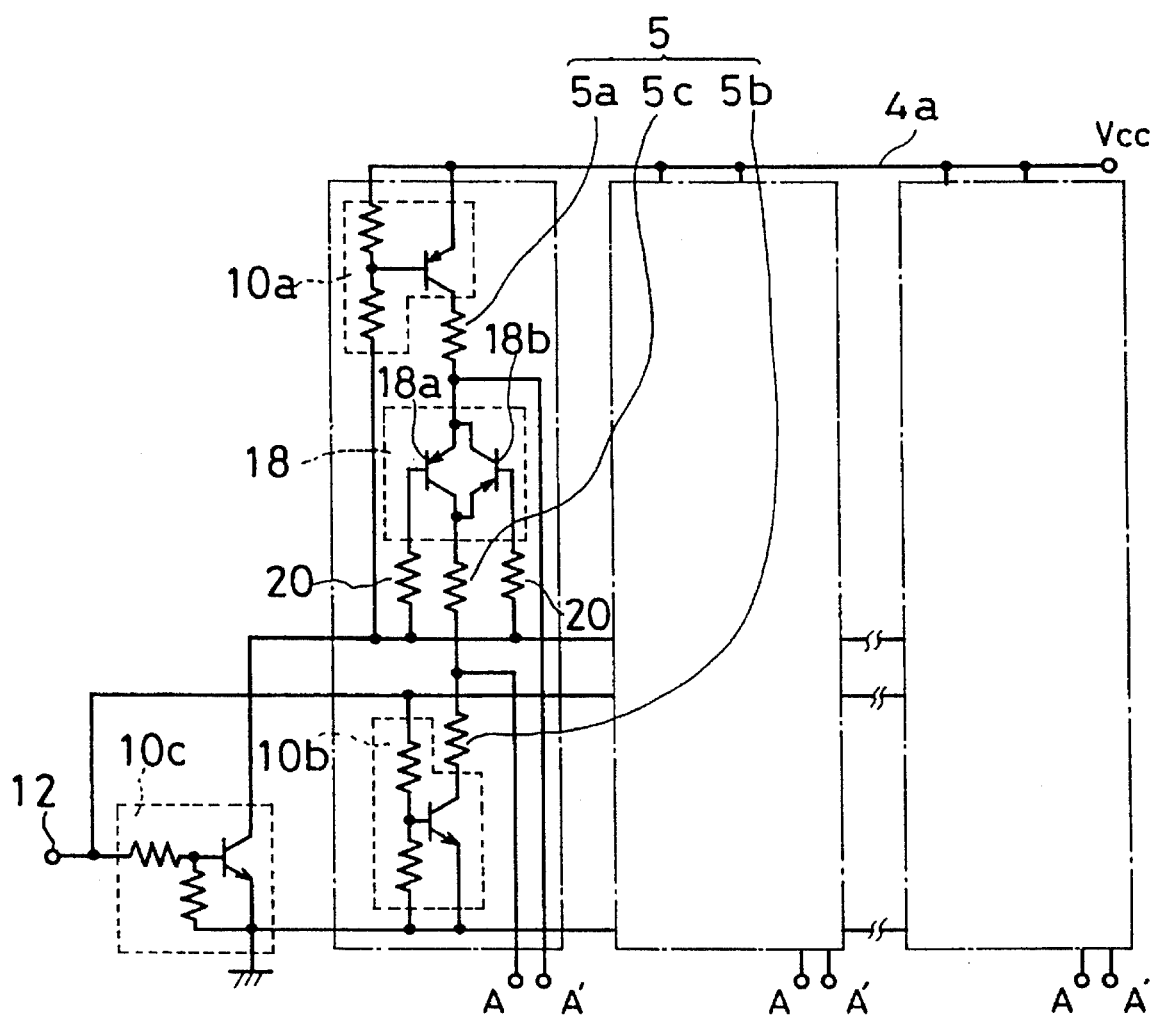
FIG. 10 is a circuit diagram showing a modified example of FIG. 9 embodiment.

To the SCSI bus line 3 of the differential type as shown in FIG. 5, embodiments shown in FIG. 9 and FIG. 10 can be applied. In the FIG. 9 embodiment, as in the FIG. 6 embodiment, resistor combined with a PNP transistors 10a and resistor combined with an NPN transistor 10b are used in association with the terminating resisters 5a and 5b. In addition, a combination of an resistor and a PNP transistor 10c is used for inverting the ON signal or OFF signal being inputted from the external terminal 12.

Characteristically, a bi-directional transistor 18 is connected between the signal lines 4b and 4b', that is, between positions denoted by reference symbols A and A' in FIG. 5. The bi-directional transistor 18 includes two PNP transistors (or alternatively NPN transistors) complementarily connected to each other, and an emitter of the transistor 18a and a collector of the transistor 18b are connected together to the signal line 4b'(the point A'), and a collector of the transistor 18a and an emitter of the transistor 18b are connected together to the signal line 4b (the point A) via the terminating resistor 5c. As in the case of FIG. 5, one end of the terminating resistor 5b is connected to the signal line 4b and one end of the terminating resistor 5a is connected to the signal line 4b'. In addition, the bases of the transistor 18a and 18b of the bi-directional transistor 18 are directly connected to the external terminal 12 via suitable resistors 20, respectively.

In FIG. 9 embodiment, when an ON signal of a low level is inputted from the external terminal 12, the transistor 10a associated with the terminating resistor 5a is turned-on. At the same time, since a high level signal is outputted from the transistor 10c, the transistor 10b associated with the terminating resistor 5b is also turned-on. Therefore, base bias voltages are applied to the two transistors 18a and 18b constituting the bi-directional transistor 18. If a signal level at the point A is larger than a signal level at the point A', the transistor 18b is turned-on. Inversely, if the signal level at the point A' is larger than the signal level at the point A, the transistor 18a is turned-on. Therefore, depending on a magnitude of the signal level on the signal line 4b or 4b', either the transistor 18a or 18b is turned-on. Thus, all the terminating resistors 5a, 5b and 5c constituting the terminator 5 are enabled, and thus, it is possible to obtain a state where the terminator 5 is connected to the bus line 3.

If an OFF signal of a high level is inputted to the external terminal 12, the transistor 10a associated with the terminating resistor 5a and the transistors 18a and 18b constituting the bi-directional transistor 18 are turned-off. At the same time, since a low level signal is outputted from the transistor 10c, the transistor 10b associated with the terminating resistor 5b are also turned-off. Thus, all the terminating resistors 5a, 5b and 5c constituting the terminator 5 is disabled, and therefore, the terminator 5 is disconnected from the bus line 3.

In FIG. 9 embodiment, an ON signal of a low level and one OFF signal of a high level are applied to the external terminal 12; however, the polarities of the ON signal and OFF signal may be inverted. In this case, an embodiment shown in FIG. 10 can be utilized. In the FIG. 10 embodiment, the transistor 10c for inverting the control signal from the external terminal 12 is constructed as an NPN transistor, and an output of the transistor 10c is applied to the base of the transistor 10a, and the control signal from the external terminal 12 is applied to the base of the transistor 10b.

In the FIG. 10 embodiment, when an ON signal of a high level is inputted from the external terminal 12, the transistor 10a associated with the terminating resistor 5a is turned-on since a low level signal is outputted from the transistor 10c. At the same time, the transistor 10b associated with the terminating resistor 5b is also turned-on. Therefore, base bias voltages are applied to the two transistors 18a and 18b constituting the bi-directional transistor 18. If a signal level at the point A is larger than a signal level at the point A', the transistor 18b is turned-on. Inversely, if the signal level at the point A' is larger than the signal level at the point A, the transistor 18a is turned-on. Therefore, depending on a magnitude of the signal level on the signal line 4b or 4b', either the transistor 18a or 18b is turned-on. Thus, all the terminating resistors 5a, 5b and 5c constituting the terminator 5 are enabled, and thus, it is possible to obtain a state where the terminator 5 is connected to the bus line 3.

If an OFF signal of a low level is inputted to the external terminal 12, the transistor 10b associated with the terminating resistor 5b is turned-off. At the same time, since a high level signal is outputted from the transistor 10c, the transistor 10a associated with the terminating resistor 5a, and the transistors 18a and 18b, are also turned-off. Thus, all the terminating resistors 5a, 5b and 5c constituting the terminator 5 are disabled, and therefore, it becomes a state where the terminator 5 is disconnected from the bus line 3.

It will be easily understood by those skilled in the art that in the FIG. 9 or 10 embodiment, each of the transistors 10a may be an NPN transistor and each of the transistors 10b may be a PNP transistor, and that the transistor 10a and the terminating resistor 5a may be inverted in their positions, the transistor 10b and the terminating resistor 5b may be inverted in their positions, and the bi-directional transistor 18 and the terminating resistor 5c may be inverted in their positions.

Figure 4:
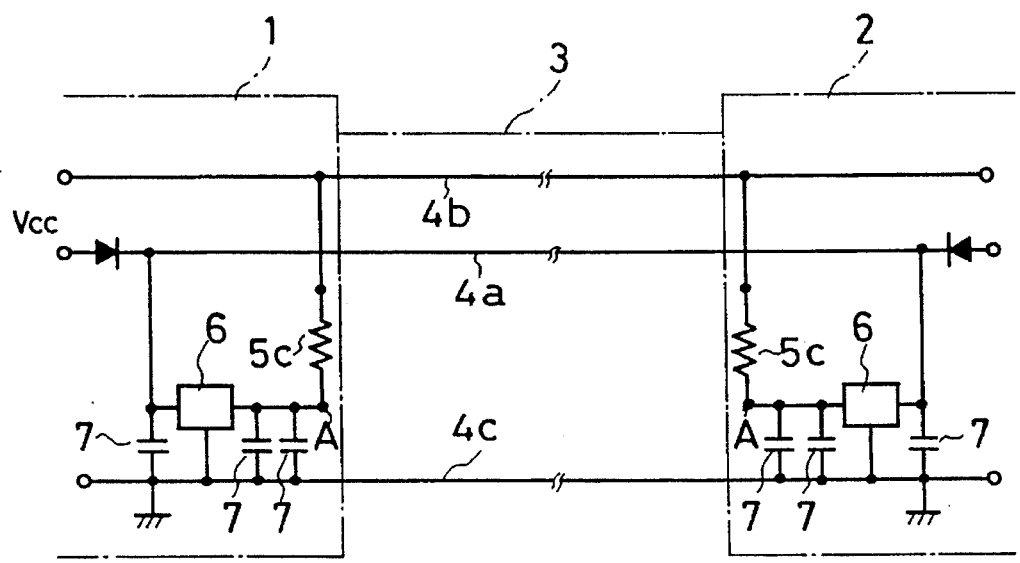
FIG. 4 is a circuit diagram showing another example of a conventional bus terminating circuit of a single ended type.
Figure 11:
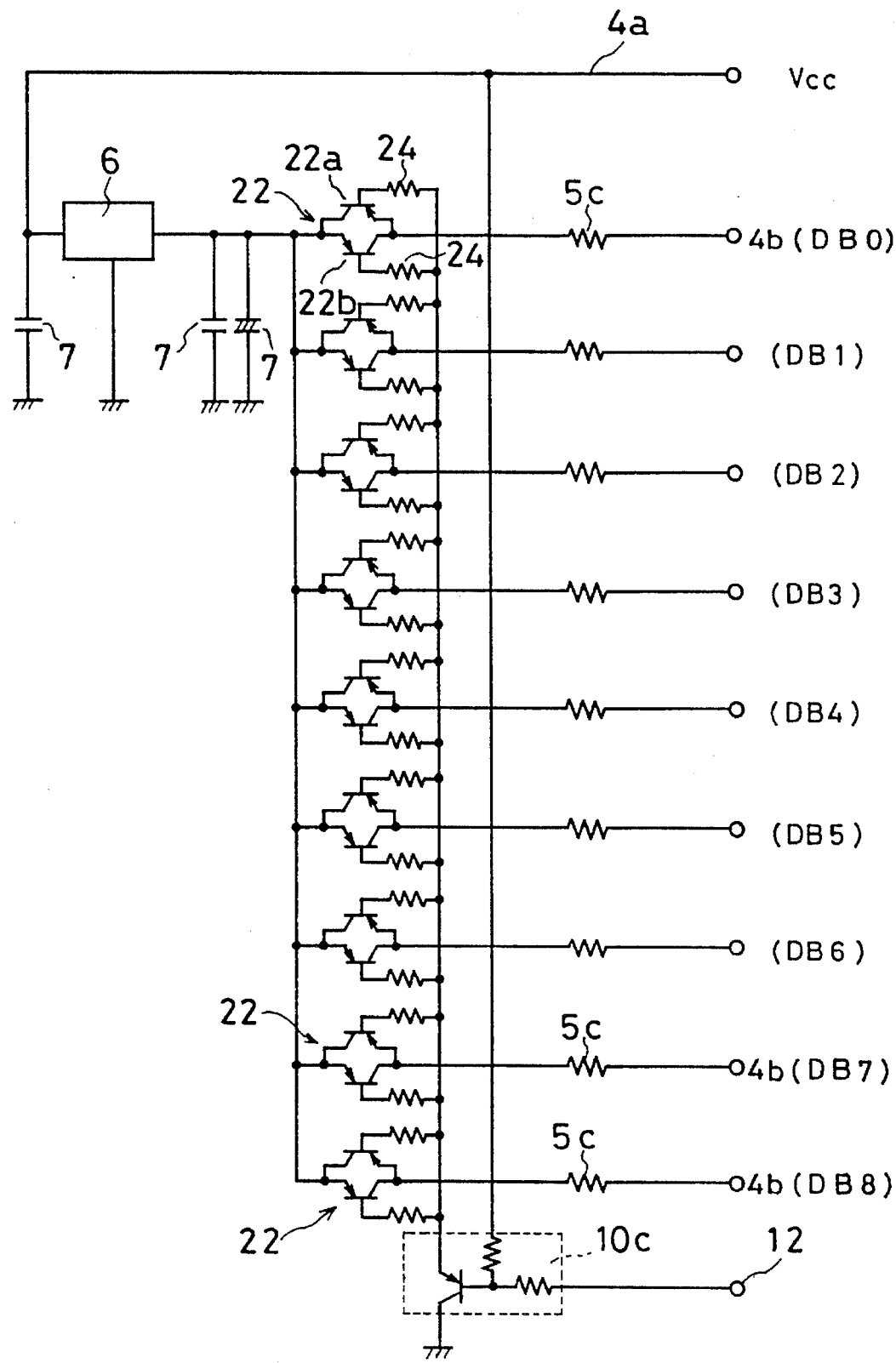
FIG. 11 is a circuit diagram showing a further embodiment which the present invention is applied to FIG. 4 bus terminating circuit.

FIG. 11 shows another embodiment in accordance with the present invention which can be applied to the SCSI bus line 3 of a single ended type for the SCSI-2 system as shown in FIG. 4. In the FIG. 11 embodiment, between each of the terminating resistors 5c and the regulator 6, is a bi-directional transistor 22 which is constructed by two PNP transistors 22a and 22b complementarily connected to each other, like the bi-directional transistor 18 as shown in FIG. 9 or FIG. 10. Bases of transistors 22a and 22b are commonly connected to an output of a transistor 10c via suitable resistors 24. Then, a collector of the transistor 22a and an emitter of the transistor 22b are commonly connected to an output of the regulator 6, and an emitter of the transistor 22a and a collector of the transistor 22b are commonly connected to one end of the terminating resistor 5c.

In operation, when an ON signal of a high level is inputted from the external terminal 12, since a low level signal is outputted from the transistor 10c, base bias voltages are applied to the bases of the two transistor 22a and 22b constituting the bi-directional transistor 22. If a signal level of the signal line 4b is larger than an output voltage level of the regulator 6, the transistor 22a is turned-on and, if the output voltage level of the regulator 6 is larger than the signal level of the signal line 4b, the transistor 22b is turned-on. Therefore, even if the signal on the signal line 4b is the high level or the low level, the transistor 22a or 22b, that is, the bi-directional transistor 22 is turned-on, and therefore, it becomes a state where each of the terminating resistors 5c is connected to the bus line 3, that is, to each of the signal lines 4b.

When an OFF signal of a low level is inputted to the external terminal 12, an output of the transistor 10c becomes a high level, and therefore, the transistors 22a and 22b are both turned-off. Therefore, each of the terminating resistors 5c is disconnected from the bus line 3, that is, from each of the signal lines 4b.

Figure 12:
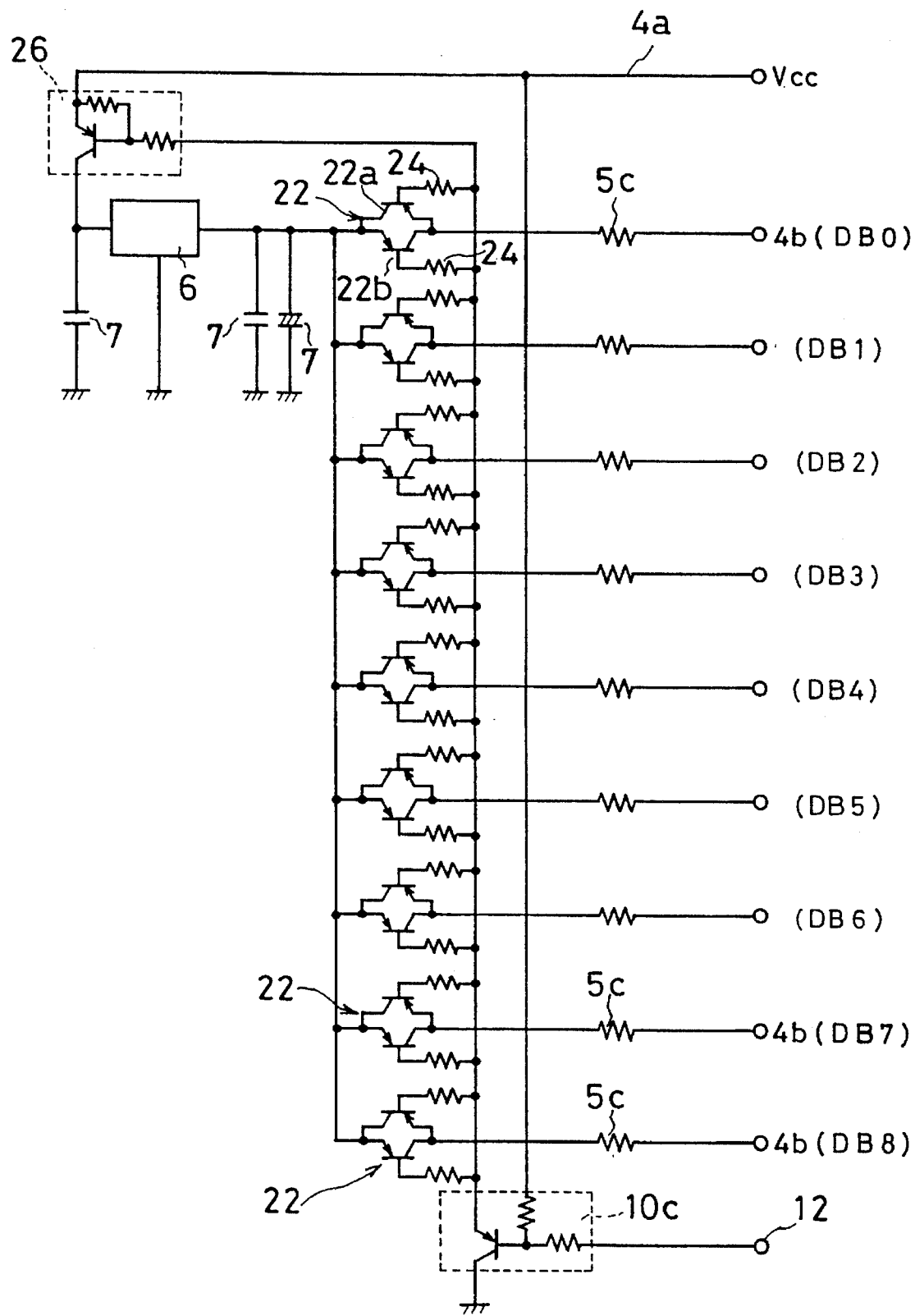
FIG. 12 is a circuit diagram showing a modified example of FIG. 11 embodiment.

FIG. 12 shows a modified example of FIG. 11 embodiment and, in FIG. 12 embodiment, a PNP switching transistor 26 having structure similar to that of the transistor 10c is inserted between the voltage source line 4a and the regulator 6. The transistor 26 is turned-on or off in response to an output of the transistor 10c. Therefore, only the control signal is applied to the external terminal 12, not only the terminating resistor 5c is connected or disconnected to or from the bus line 3 but also the regulator 6 is enabled or disabled.

More specifically, if an ON signal of a high level is inputted to the external terminal 12, the output of the transistor 10c becomes a low level, and therefore, the transistor 26 is turned-on so that the power source line 4 and the regulator 6 are connected to each other. If an OFF signal of a low level is inputted to the external terminal 12, the output of the transistor 10c becomes a high level, and therefore, the transistor 26 is turned-off and the regulator 6 is disconnected from the power source line 4a.

Figure 13:
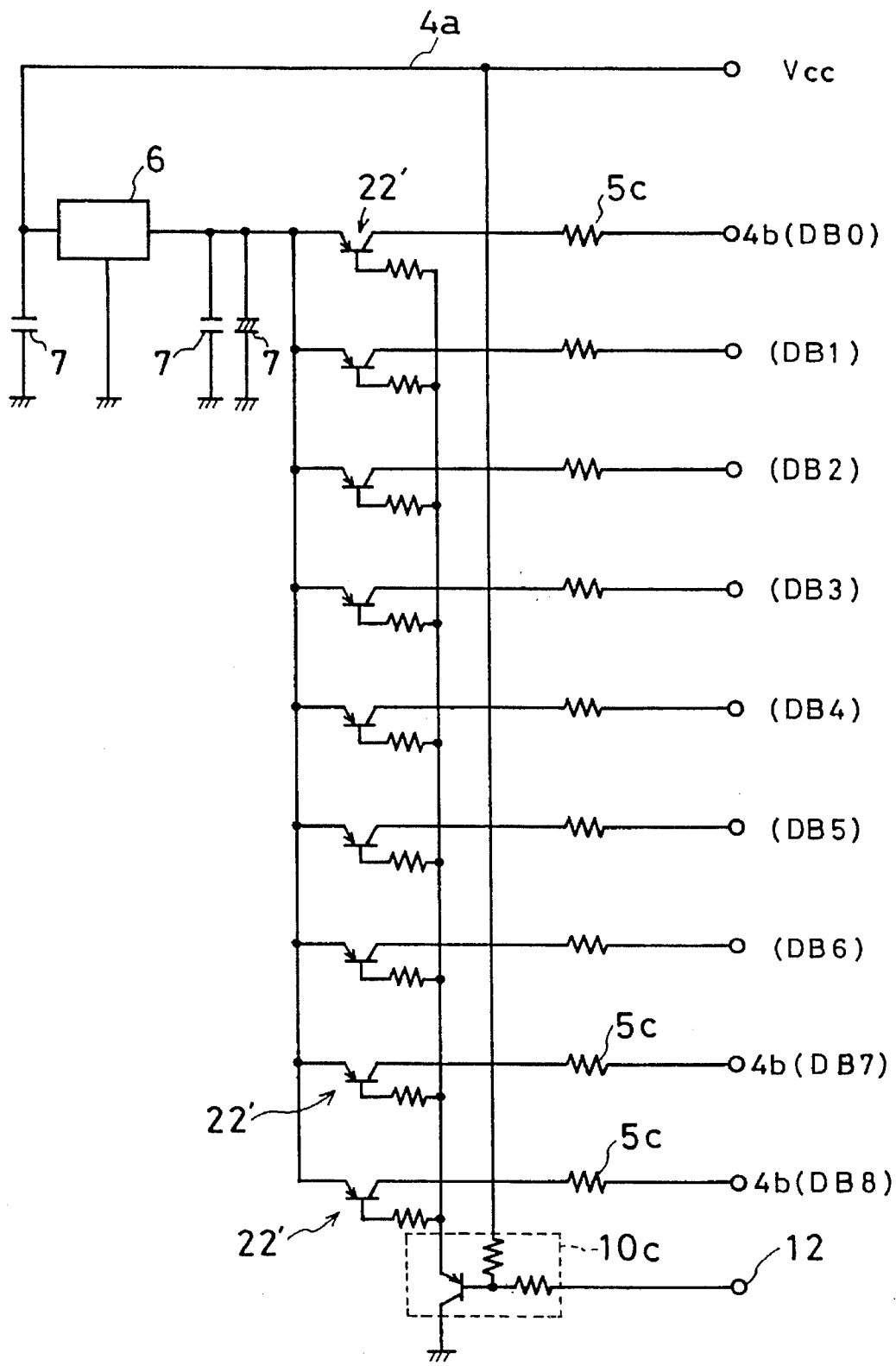
FIG. 13 is a circuit diagram showing a still further embodiment in which the present invention is applied to FIG. 4 bus terminating circuit.
Figure 14:
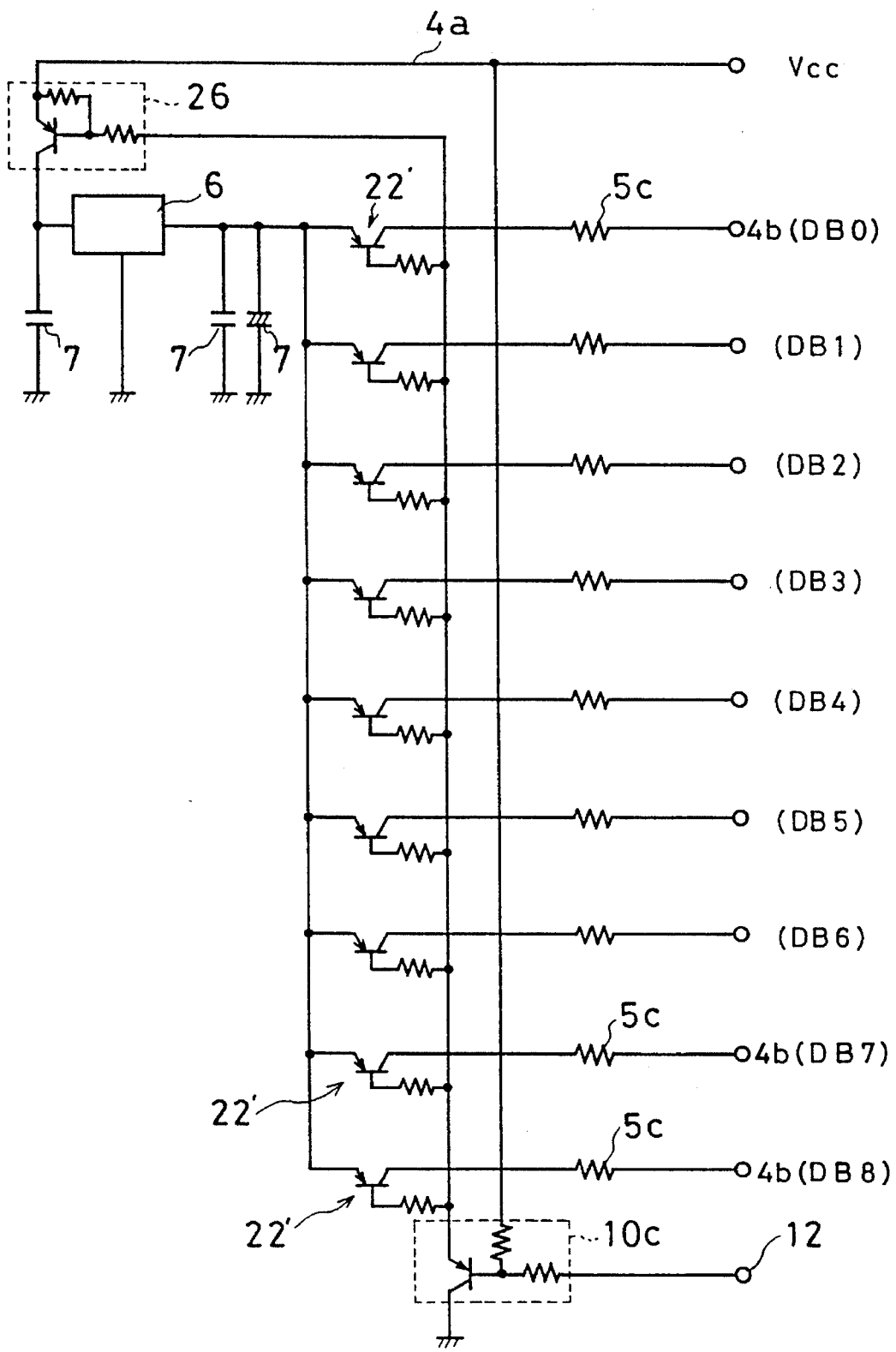
FIG. 14 is a circuit diagram showing a modified example of FIG. 13 embodiment.

In FIG. 11 or FIG. 12 embodiment, the bi-directional transistor 22 is inserted between the regulator 6 and the terminating resistor 5; however, as shown in FIG. 13 and FIG. 14, a unidirectional transistor 22' may be inserted between the regulator 6 and the terminating resistor 5c in place of the bi-directional transistor 22. In FIG. 13 or FIG. 14 embodiment, if an ON signal of a low level or a high level is inputted to the external terminal 12, in spite of a signal level of the signal line 4b, the transistor 22' is turned-on, and therefore, the terminating resistor 5c can be enabled.

In addition, the transistor 26 of FIG. 14 embodiment has the same function as that of the transistor 26 of FIG. 12 embodiment.

It will be easily understood by those skilled in the art that in FIG. 11, 12 13 or 14 embodiment, the bi-directional transistor 18 and the terminating resistor 5c may be inverted in their positions. That is, between the output end of the regulator 6 and the signal line 4b, only a series connection of the terminating resistor 5c and an active element such as the bi-directional transistor 22 or the unidirectional transistor 22' may be connected.

Figure 15:
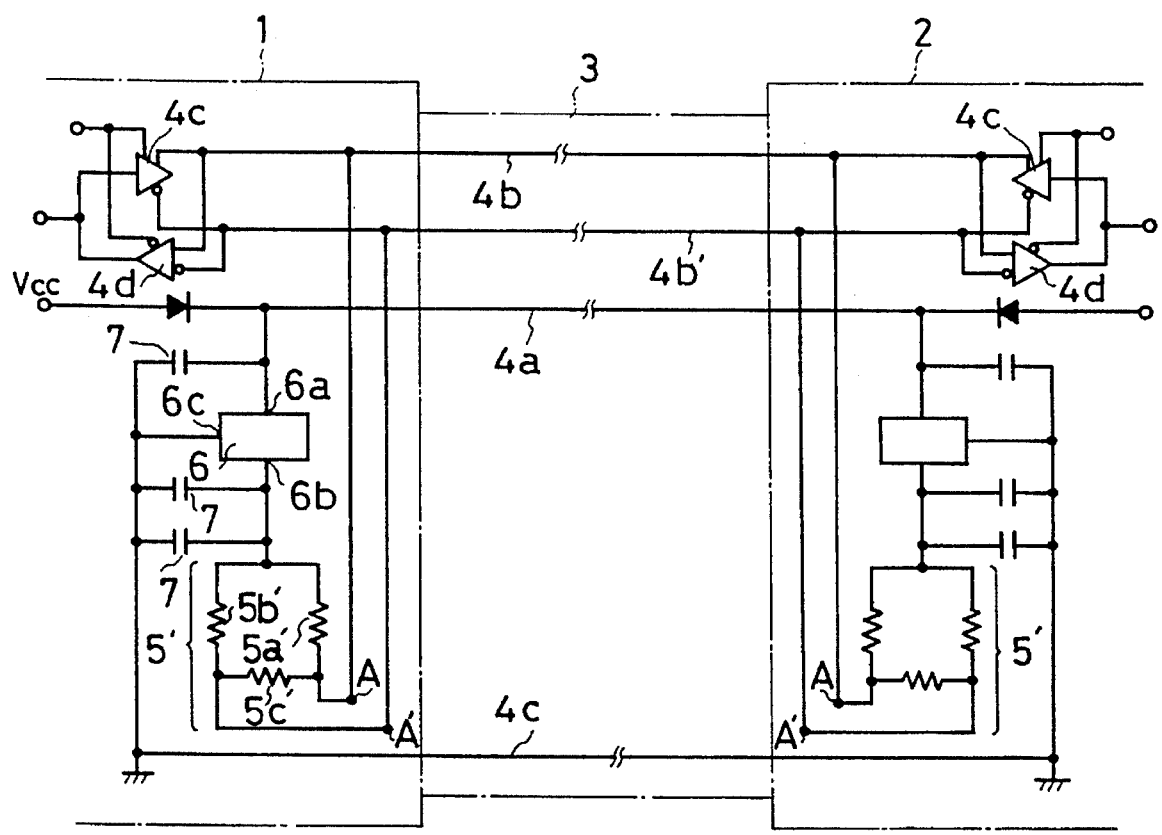
FIG. 15 is a circuit diagram showing a bus terminating circuit which is an embodiment in accordance with the present invention, in which a 3-terminal regulator shown in FIG. 4 bus terminating circuit is introduced in FIG. 5 bus terminating circuit.

In an embodiment shown in FIG. 15, the structure of SCSI-2 system shown as in FIG. 4 is added to the SCSI bus line of a differential type as shown in FIG. 5. More specifically, in FIG. 5 bus terminating circuit, the signal line 4b' is connected to the power source line 4a via the terminating resistor 5a and the signal line 4b is connected to the power source line 4a via the terminating resistors 5a and 5c, and therefore, if a noise is generated on the power source line 4a, the voltage supplied to the signal line 4b or 4b' from the power source line 4a is changed. Consequently, there was a case where it is impossible to exactly determine a signal level on the signal line 4b or 4b', and therefore, a transmission error occurs.

Then, in FIG. 15 embodiment, an input 6a of the regulator 6 is connected to the power source line 4a and an output 6b of the regulator 6 is connected to a terminator 5' composed of terminating resistors 5a', 5b' and 5c'. More specifically, the terminator 5' includes the terminating resistors 5a' and 5b' having respective one ends connected to the output 6b of the regulator 6, and other ends of the terminating resistors 5a' and 5b' are connected to the signal lines 4b and 4b', respectively. Other ends of the terminating resistors 5a' and 5b' are also connected to each other via the terminating resistor 5c'. The impedance of the terminator 5' viewed from the signal line 4b becomes equal to a resistance value of a parallel connection of a synthesized resistor of the terminating resistors 5b' and 5c' and the terminating resistor 5a'. The impedance of the terminator 5' viewed from the signal line 4b' becomes equal to a resistance value of a parallel connection of a synthesized resistor of the terminating resistors 5a' and 5c' and the terminating resistor 5b'. Therefore, when the terminating resistors 5a' and 5b' are both set as 330 ohms and the terminating resistor 5c' is set as 150 ohms, the impedance viewed from the signal line 4b or 4b' becomes 196 ohms that is identical to that of FIG. 4 conventional circuit.

In accordance with FIG. 15 embodiment, since the regulator 6 is utilized, even if a noise is generated on the power source line 4a, the signal level is not affected by the noise. In addition, since the power source line 4a is not connected to the ground through a terminating resistor, no electric power is wastefully consumed at a time of bus free.

Figure 16:
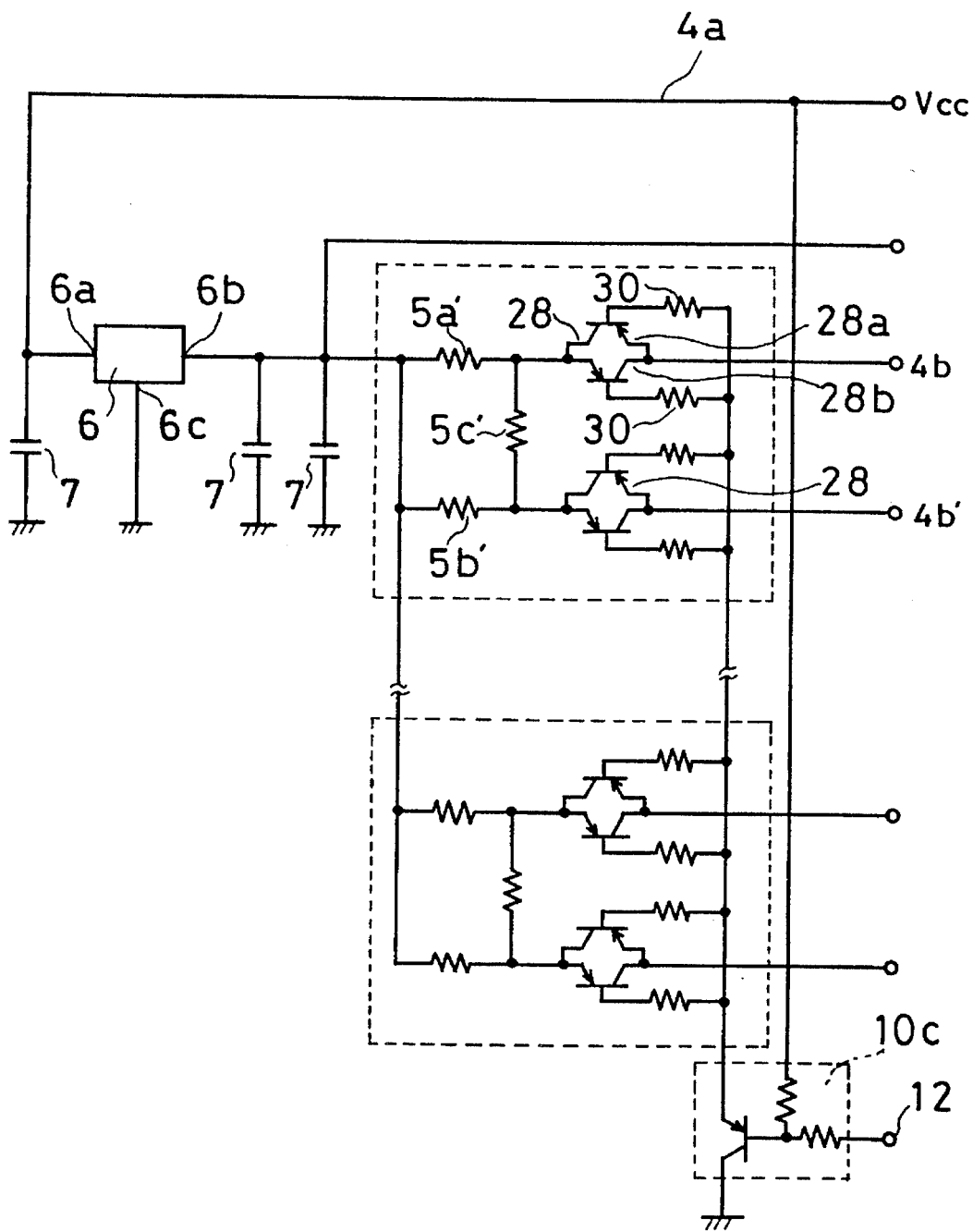
FIG. 16 is a circuit diagram showing another embodiment in which the present invention is applied to FIG. 15 bus terminating circuit.

Each of embodiments shown in FIG. 16 and FIG. 17 is an embodiment wherein the above described terminator 5', that is, the terminating resistors 5a', 5b' and 5c' are connected or disconnected to or from the bus line by an active element.

With reference to FIG. 16, the output 6b of the regulator 6 is commonly connected to respective one end of the terminating resistors 5a' and 5b' and, between another end of the terminating resistor 5a' and the signal line 4b' and between another end of the terminating resistor 5b' and the signal line 4b, respectively, a bi-directional transistor 28 constructed by two PNP transistors 28a and 28b which are complementary connected to each other as similar to the bi-directional transistor 18 shown in FIG. 9 or FIG. 10. Bases of respective transistors 20a and 20b are commonly connected to an output of the inverting transistor 10c via suitable resistors 30. Then, in the terminator 5' connected to the terminating resistor 5a', a collector of the transistor 28a and an emitter of the transistor 28b are commonly connected to another end of the terminating resistor 5a', and an emitter of the transistor 28a and a collector of the transistor 28b are commonly connected to the signal line 4b. In the terminator 5' connected to the terminating resistor 5b', a collector of the transistor 28a and an emitter of the transistor 28b are commonly connected to another end of the terminating resistor 5b', and an emitter of the transistor 28a and a collector of the transistor 28b are commonly connected to the signal line 4b'.

In operation, when an ON signal of a high level is inputted from the external terminal 12, since a low level signal is outputted from the transistor 10c, base bias voltages are applied to the bases of the two transistors 28a and 28b constituting the bi-directional transistor 28. If a signal level of the signal line 4b is larger than an output voltage level of the regulator 6, the transistor 28a is turned-on and, if the output voltage level of the regulator 6 is larger than the signal level of the signal line 4b, the transistor 28b is turned-on. Therefore, even if the signal on the signal line 4b is the high level or the low level, the transistor 28a or 28b, that is, the bi-directional transistor 28 is turned-on, and therefore, it becomes a state where each of the terminator 5' is connected to the bus line 3.

When an OFF signal of a low level is inputted to the external terminal 12, an output of the transistor 10c becomes a high level, and therefore, the transistors 28a and 28b are both turned-off. Therefore, each of the terminator 5' is disconnected from the bus line 3.

FIG. 17 shows a modified example of FIG. 16 embodiment and, in FIG. 17 embodiment, a switching transistor 26 having the same structure as that of the inverting transistor 10c is inserted between the power source line 4a and the regulator 6. The transistor 26 has the same function as that of the transistor of FIG. 12 embodiment.

The specific circuit configuration of each of the above described embodiments is only an example of the invention, and therefore, instead of the transistor, an IC such as an operational amplifier may be utilized.

In addition, the present invention is applied to an SCSI bus line in each of the respective embodiments; however, the present invention can also be, of course, applied to the aforementioned "GP-IB", "RS-232C" and systems, etc. In such case, the number of terminators 5 or 5' and the number of active elements associated therewith may be changed in accordance with the number of the signal lines 4b or 4b'.

Furthermore, in the above described embodiments, the ON signal or OFF signal is applied to the external terminal 12 by the switches 14 and 16a–6d; however, such an ON signal or OFF signal may also be electrically applied to the external terminal 12 by utilizing software.

Furthermore, each of the above described embodiments can be formed by a hybrid IC; however, it may also be formed by combination of discrete components or a monolithic IC.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bus terminating circuit for terminating a bus line, the bus line including a power source line, a first signal line for transmitting a first data signal, a second signal line for transmitting a second data signal that is the inverse of said first data signal, and a ground line, the bus terminating circuit comprising:

a first series connection of a first terminating resistor and a first active switch connected between said power source line and said second signal line, said first active switch having a control input for being turned-on or -off by a first control signal;

a second series connection of a second terminating resistor and a second active switch connected between said first signal line and said ground line, said second active switch having a control input for being turned-on or -off by a second control signal;

an external terminal for receiving an external control signal from an external source and in response thereto, applying said first control signal and said second control signal to simultaneously turn on or off said first active switch and said second active switch, respectively; and a third series connection of a third terminating resistor and a bi-directional third active switch, connected between said first terminating resistor and said second terminating resistor, and thereby turned-on or -off in response to turning on or off said first and second active switches.

2. A bus terminating circuit in accordance with claim 1, wherein said first active switch is turned-on in response to said first control signal having a first polarity, and said second active switch is turned-on in response to said second control signal having a second polarity opposite to said first polarity, said bus terminating circuit further comprising an inverter for inverting said external control signal inputted from said external terminal, wherein an output of said inverter is applied to said first active switch as said first control signal, and said external control signal is applied to said second active switch as said second control signal.

3. A bus terminating circuit in accordance with claim 1, wherein said first active switch is turned-on in response to said first control signal having a first polarity, and said second active switch is turned-on in response to said second control signal having a second polarity opposite to said first polarity, said bus terminating circuit further comprising an inverter for inverting said external control signal inputted from said external terminal, wherein an output of said inverter is applied to said second active switch as said second control signal, and said external control signal inputted to said external terminal is applied to said first active switch as said first control signal.

4. A bus terminating circuit in accordance with claim 1, wherein said bi-directional active switch includes two transistors which are connected in complementary manner to each other.

5. A bus terminating circuit for terminating a bus line, the bus line including a power source line, a signal line and a ground line, the bus terminating circuit comprising:

a regulator having an input connected to said power source line for adjusting a voltage inputted to said input, to be a constant voltage to be outputted from an output thereof;

a first capacitor connected to said input of said regulator;

a second capacitor connected to said output of said regulator;

a series connection of a terminating resistor and a bidirectional active switch connected between said output of said regulator and said signal line, said bidirectional active switch being turned-on or -off by a switch control signal received at a switching input of said active switch;

an external terminal for receiving an external control signal from an external source; and an active element having three terminals connected to said external terminal, to said switching input of said bidirectional active switch, and to a reference potential, respectively, said active element being responsive to said external control signal from said external terminal, and in response thereto, applying said switch control signal to said bidirectional active switch.

6. A bus terminating circuit in accordance with claim 5, further comprising second switching means inserted between said power source line and said regulator input.

7. A bus terminating circuit in accordance with claim 6, further comprising input means for applying said switch control signal to said active switch in response to said external control signal inputted to said external terminal, said second switching means being turned on or off in response to a signal applied by said input means.

8. A bus terminating circuit in accordance with claim 5, wherein said active element includes a transistor having an input terminal connected to said external terminal.

9. A bus terminating circuit in accordance with claim 5, wherein said active switch includes a bi-directional active switch.

10. A bus terminating circuit in accordance with claim 9, wherein said bi-directional active switch includes two transistors which are connected in complementary manner to each other.

11. A bus terminating circuit according to claim 5, wherein said bus line includes a plurality of signal lines and one said bidirectional active switch is provided corresponding to each of said plurality of signal lines; and said active element is connected for applying said switch control signal to said switching inputs of all of said bidirectional active switches in common.

12. A bus terminating circuit for terminating a bus line, the bus line including a power source line, and a first signal line for transmitting a first data signal, and a second signal line for transmitting a second data signal that is an inversion of said first data signal, the bus terminating circuit comprising:

a regulator having an input connected to said power source line, for regulating a voltage inputted to said input to be a constant voltage to be outputted from an output thereof;

a first terminating resistor having one end connected to said output of said regulator and the other end connected to said first signal line;

a second terminating resistor having one end connected to said output of said regulator and the other end connected to said second signal line; and a third terminating resistor having ends connected to said first and second signal lines, respectively.

13. A bus terminating circuit in accordance with claim 12, further comprising:

a first active switch connected between said first terminating resistor and said first signal line, said first active switch being turned-on or -off in accordance with a first control signal;

a second active switch connected between said second terminating resistor and said second signal line, said second active switch being turned-on or -off in accordance with a second control signal; and an external terminal for receiving an external control signal from an external source and in response thereto, applying said first control signal and said second control signal to said first active switch and said second active switch, respectively.

14. A bus terminating circuit in accordance with claim 13, further comprising switching means inserted between said power source line and said regulator.

15. A bus terminating circuit in accordance with claim 14, further comprising input means for applying said first control signal and said second control signal to said first active switch and said second active switch, respectively, in response to said external control signal inputted to said external terminal, said switching means being turned-on or -off in response to a signal applied by said input means.

16. A bus terminating circuit for terminating a bus line, the bus line including a power source line and a signal line, the bus terminating circuit comprising:

a regulator having an input connected to said power source line for adjusting a voltage inputted to said input, to be a constant voltage to be outputted from an output thereof;

a first capacitor connected to said input of said regulator;

a second capacitor connected to said output of said regulator;

a series connection of a terminating resistor and a bidirectional active switch connected between said output of said regulator and said signal line, said active switch being turned-on or -off by a switch control signal;

an external terminal for receiving an external control signal from an external source and for applying said switch control signal to said bidirectional active switch, and switching means inserted between said power source line and said regulator, and means for turning said switching means on or off at a time of turning on or off said bidirectional active switch.

17. A bus terminating circuit in accordance with claim 16, further comprising input means for simultaneously applying said switch control signal to said active switch and turning said switching means on or off in response to said external control signal inputted to said external terminal.

18. A bus terminating circuit for terminating a bus line, the bus including a power source line and a signal line the bus terminating circuit, comprising:

a regulator having an input connected to said power source line for adjusting a voltage inputted to said input to be a constant voltage to be outputted from an output thereof;

a series connection of a terminating resistor and an active switch connected between said output of said regulator and said signal line, said active switch including a bi-directional active switch which is turned-on or -off by a switch control signal; and an external terminal for receiving an external control signal from an external source and in response thereto, applying said switch control signal to said active switch.

19. A bus terminating circuit in accordance with claim 18, further comprising input means for applying said switch control signal to said bi-directional active switch in response to said external control signal inputted to said external terminal.

20. A bus terminating circuit in accordance with claim 18, wherein said bi-directional active switch includes two transistors which are connected in complementary manner to each other.

* * * * *